United States Patent
Chang

[19]

[11] Patent Number: 6,042,242
[45] Date of Patent: Mar. 28, 2000

[54] ORNAMENTAL DISPLAY WITH SOUND AND LIGHTING EFFECT PRODUCING MEANS

[76] Inventor: Ching-Ho Chang, 2F, No.5 Alley 8 Lane Szu Wei, Chung Cheng Rd., Hsin-Tien, Taipei Hsien, Taiwan

[21] Appl. No.: 09/199,340

[22] Filed: Nov. 25, 1998

[51] Int. Cl.[7] .................................. F21V 8/00; F21S 9/00
[52] U.S. Cl. ..................... 362/86; 362/276; 362/395; 362/249; 362/414; 362/554; 362/581; 362/237
[58] Field of Search .......................... 362/86, 249, 276, 362/295, 383, 394, 395, 410–414, 431, 552, 554, 556, 559, 576, 581, 802, 237

[56] References Cited

U.S. PATENT DOCUMENTS

| | | | |
|---|---|---|---|
| 1,999,579 | 4/1935 | Squier | 362/122 |
| 3,721,815 | 3/1973 | Wall | 362/554 |
| 3,904,865 | 9/1975 | McCarthy | 362/565 |
| 4,433,362 | 2/1984 | Ban | 362/86 |
| 5,161,874 | 11/1992 | Benes | 362/552 |
| 5,174,645 | 12/1992 | Chung | 362/394 |

*Primary Examiner*—Alan Cariaso
*Attorney, Agent, or Firm*—Jacobson, Price, Holman & Stern, PLLC

[57] ABSTRACT

An ornamental display includes a stand holding a plurality of lamps, bundles of optical glass fibers respectively fastened to the stands to pick up light from the lamps, a speaker, and a control IC controlled by a photoelectric switch and a sound-controlled switch to turn on the lamps in producing a lighting effect and the speaker in producing a sound effect when the intensity of ambient light drops below a predetermined value or, when a noise is produced.

1 Claim, 3 Drawing Sheets

ORNAMENTAL DISPLAY WITH SOUND AND LIGHTING EFFECT PRODUCING MEANS

BACKGROUND OF THE INVENTION

The present invention relates to an ornamental display, and more particularly to such an ornamental display which is controlled by a photoelectric switch or sound-controlled switch to produce sound and lighting effects.

Conventional ornamental display devices are immovable. These devices attract people by their designs. In recent years, a variety of motion display devices have been disclosed. These display devices are more attractive then conventional stationary ornamental display devices. There are also known ornamental display devices with sound and/or lighting effect generating means. These ornamental display devices can be controlled to produce sound and/or lighting effects.

SUMMARY OF THE INVENTION

It is one object of the present invention to provide an ornamental display which produces sound and lighting effects. It is another object of the present invention to provide an ornamental display which automatically produces sound and lighting effects when dark. It is still another object of the present invention to provide an ornamental display which can be controlled to produce sound and lighting effects by a high noise. According to one aspect of the present invention, the ornamental display comprises a stand holding a plurality of lamps, bundles of optical glass fibers respectively fastened to the stands to pick up light from the lamps, a speaker, and a control IC controlled to turn on the lamps and the speaker in producing sound and lighting effects simulating the action of setting off fireworks. According to another aspect of the present invention, a photoelectric switch and a sound-controlled switch are installed to control the operation of the control IC. The sound-controlled switch is switched on by a noise, causing the control IC to turn on the lamps and the speaker. When the intensity of ambient light drops below a predetermined value, the control IC is driven by the photoelectric switch to turn on the lamps and the speaker.

DETAILED DESCRIPTION OF THE PREFERRED EMBODIMENT

Figure 1:
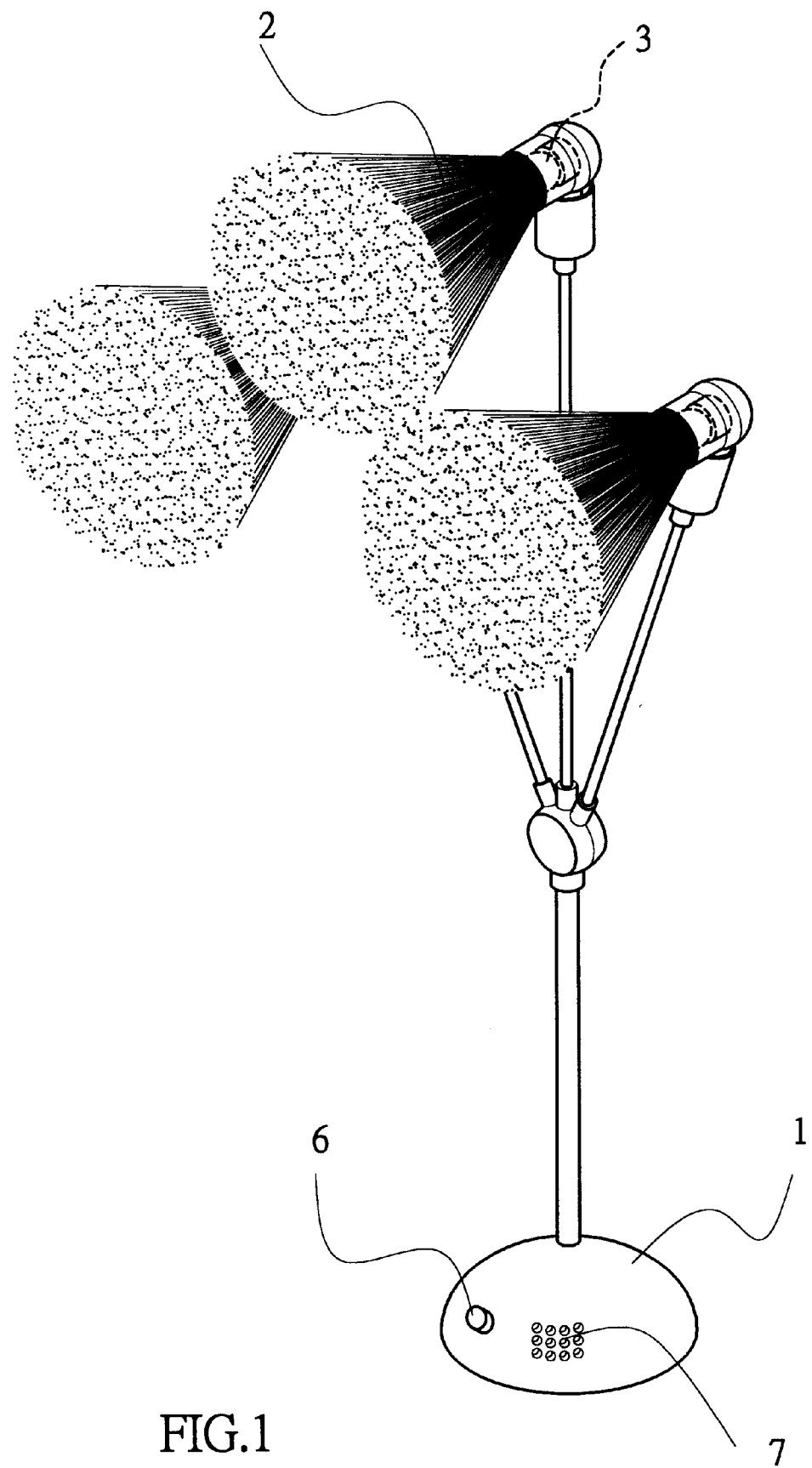
FIG. 1 is an elevational view of an ornamental display according to the present invention.
Figure 2:
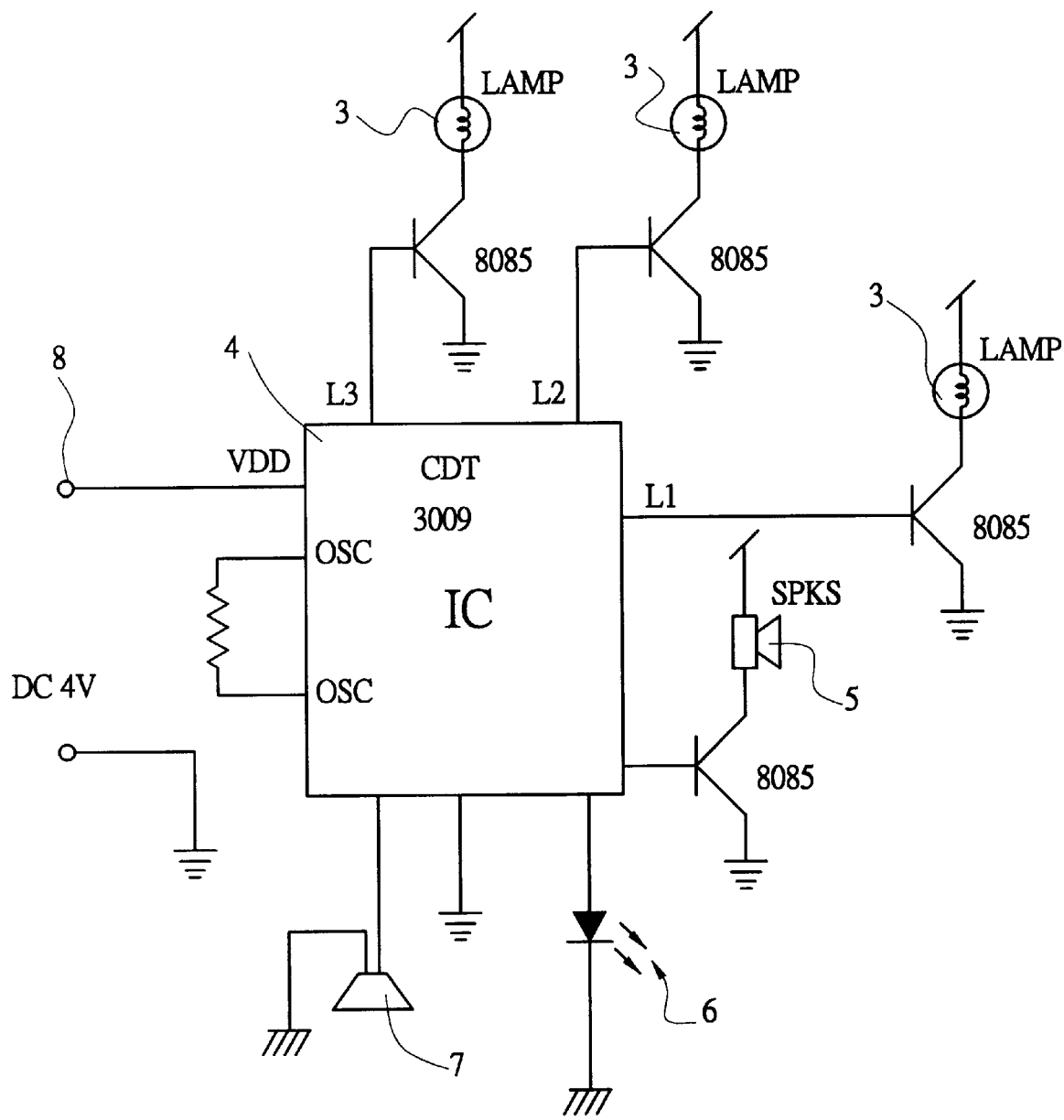
FIG. 2 is a circuit diagram of the present invention.

Referring to FIGS. 1 and 2, an ornamental display with sound and lighting effect producing means in accordance with the present invention is generally comprised of a stand 1, a plurality of light sources or example lamps 3 respectively supported on the stand 1, bundles of optical glass fibers 2 respectively mounted on the stand 1 and connected to the lamps 3, a control IC 4 installed in the base of the stand 1, a speaker 5 mounted in the base of the stand 1 and connected to the control IC 4, a photoelectric switch 6 and a sound-controlled switch 7 respectively mounted on the base of the stand 1 and connected to the control IC 4, and a battery set 8 installed in the base of the stand 1 and connected to the control IC 4.

The control IC 4 is driven to turn on the lamps 3 and the speaker 5 by the photoelectric switch 6 when the intensity of ambient light drops below a predetermined value, or by the sound-controlled switch 7 when a sound is produced. When the lamps 3 are turned on, light from the lamps 3 are transmitted through the bundles of optical glass fibers 2, causing a lighting effect (fiery display) to be produced. When the speaker 5 is turned on, a loud noise that simulates the loud noise from setting off fireworks is produced. Further, each bundle of optical glass fibers 2 has one end tied up, and an opposite end kept free. The free ends of the optical glass fibers of each bundle of optical glass fibers 2 are suspended in the air. When light passes through the optical glass fibers of the bundles of optical glass fibers 2, a big number of light spots are produced and oscillated in the air.

Figure 3:
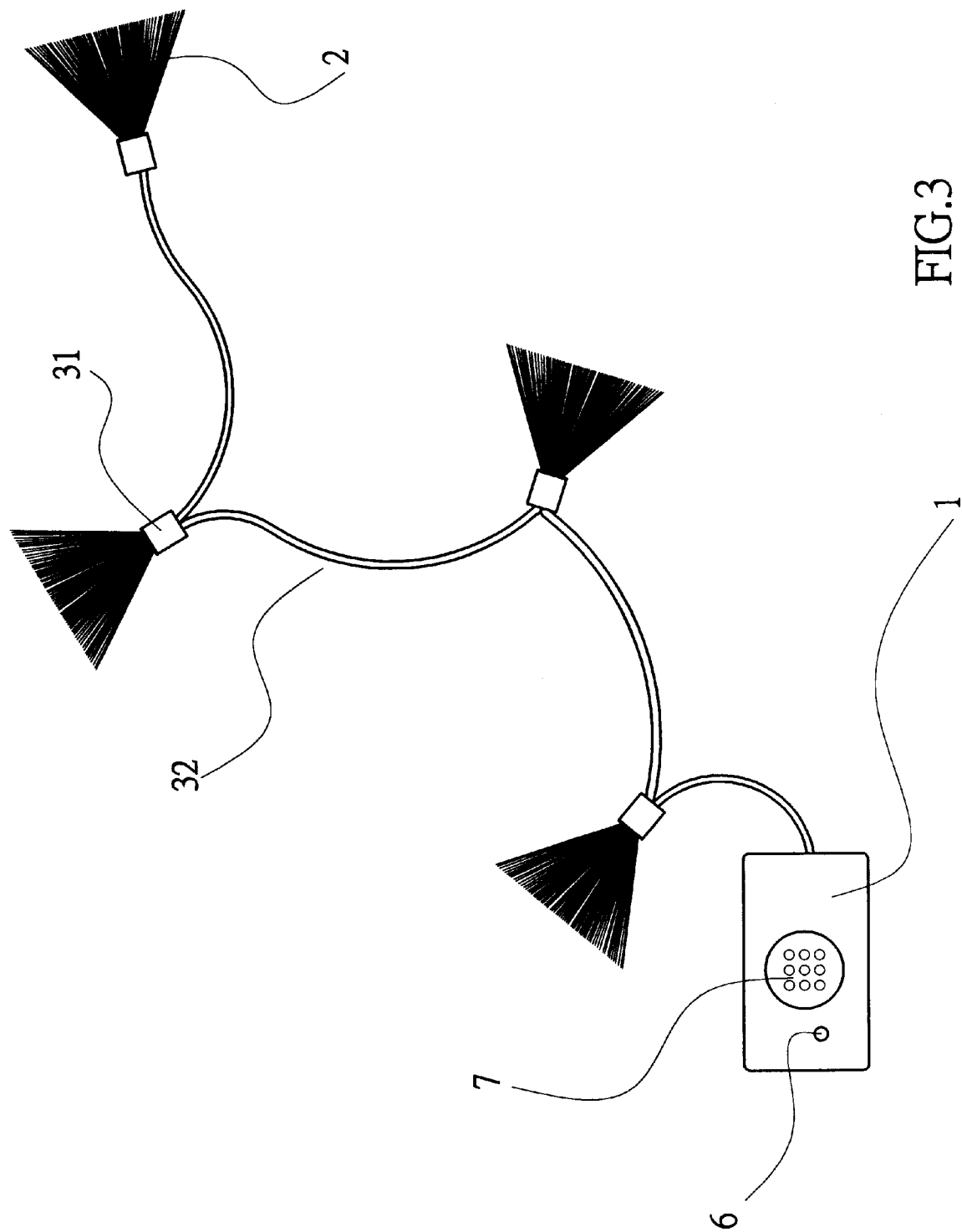
FIG. 3 shows an alternate form of the present invention.

Referring to FIG. 3 and FIG. 1 again, the bundles of optical glass fibers 2 are respectively fastened to the lamp holders 31 of the lamps 3 to pick up light from the bulbs (not shown) of the lamps 3. The lamps 3 are connected in series to the control IC 4 in the base of the stand 1.

What the invention claimed is:

1. An ornamental display comprising:

a stand having a base;

a plurality of light sources supported on said stand;

bundles of optical glass fibers respectively fastened to said stand and aimed at said light sources to pick up light from said light sources;

a sound output means mounted in the base of said stand, and controlled to output a sound;

a control IC mounted in the base of said stand, and controlled to drive said sound output means and said light sources;

a power supply device, which provides power supply to said control IC, said sound output means and said light sources;

a photoelectric switch which drives said control IC to turn on said light sources and said sound output means when the intensity of ambient light drops below a predetermined value, or to turn off said light sources and said sound output means when the intensity of ambient light surpasses a predetermined value; and a sound-controlled switch which drives said control IC to turn on said light sources and said sound output means by means of the control of a voice.

* * * * *